United States Patent [19]
Tong

[11] Patent Number: 5,897,029
[45] Date of Patent: Apr. 27, 1999

[54] TOOTHPASTE DISPENSER

[76] Inventor: Gary S. Tong, 30A Heritage Hills, Somers, N.Y. 10589

[21] Appl. No.: 08/917,242

[22] Filed: Aug. 25, 1997

[51] Int. Cl.⁶ .................................................. B65D 47/00
[52] U.S. Cl. ............................................. 222/92; 222/476
[58] Field of Search ..................................... 222/92, 476

[56] References Cited

U.S. PATENT DOCUMENTS 1,891,824 12/1932 Madigan ................................ 222/476
2,694,507 11/1954 Elliot ..................................... 222/92
2,721,004 10/1955 Schultz .................................. 222/92
3,844,454 10/1974 Buchtel ................................. 222/476
5,186,367 2/1993 Hickerson ............................. 222/476

*Primary Examiner*—Joseph A. Kaufman
*Attorney, Agent, or Firm*—Patrick J. Walsh

[57] ABSTRACT

A dispenser fitted to the neck of a toothpaste tube for dispensing a measured a dose for each squeeze of the tube.

9 Claims, 2 Drawing Sheets

TOOTHPASTE DISPENSER

BACKGROUND OF THE INVENTION

The present invention relates to dispensation of a measured amount of the contents of a container, and in a preferred embodiment, a dose of toothpaste from a tube.

Ordinarily, toothpaste is packaged in flexible tubes with the toothpaste dispensed by squeezing the tube. Such tubes have no provision for limiting the amount dispensed per squeeze. An excessive dose of toothpaste is, of course, wasteful.

New formulations of toothpaste include peroxides, baking soda, fluoride, and so forth that can be hazardous to children so that it is desirable to limit dosages of these toothpastes.

The prior art includes U.S. Pat. No. 5,447,255 directed to a toothpaste dispensing apparatus in which the tube is inserted into a mechanism for rolling the tube for dispensing a controlled quantity of toothpaste. It would appear that the cost and complexity of use of devices of this kind impede consumer acceptance.

In another aspect of using ordinary toothpaste tubes, a pocket of air resides above the body of paste remaining in the tube. In dispensing toothpaste, additional squeezing is needed to expel air ahead of the toothpaste. This condition complicates design requirements for dosage dispensers because the squeeze needed to dispense a given dose varies with the amount of air in the tube ahead of the remaining paste. In addition, when exposed to air, the paste tends to dry and becomes resistant to the action of a dispensing mechanism.

Accordingly there is need for a dosage dispenser particularly suited for toothpaste tubes wherein the the dispenser is the tube cap; is simple to fabricate and operate; eliminates presence of air in the tube ahead of the remaining paste; delivers a fixed dose of paste for each actuation; and functions as a child-proof safety cap.

SUMMARY OF THE INVENTION

The present invention provides a dispenser particularly suited for toothpaste tubes in which the dispenser is also the tube cap. The dispenser is in the form of a piston and cylinder with an extended skirt and with means for attachment to the tube outlet nozzle.

In one form of the invention, the dispenser comprises a cylindrical dispenser body with open upper and lower ends. The lower end of the dispenser body defines a closure cap that is secured to the outlet aperture or nozzle of an ordinary toothpaste tube permitting flow of the paste into the dispenser when the tube is squeezed. The dispenser body wall includes a dispensing port of select diameter located at a mid-point along the cylindrical wall.

A hollow piston with an open bottom end and a closed top tend fits within the dispenser body cylinder for sliding movement between a closed position in which the piston is fully nested within the cylinder, and an articulated position in which the upper portion of the piston extends through the open upper end of the cylinder. The hollow piston wall includes a dispensing gate in radial alignment with the cylinder port. The port and gate are in registry when dispensing a dose of toothpaste.

For dispensing a given dose, the piston and cylinder dispenser components in fully nested position are fitted to the tube nozzle with the piston gate and cylinder port out of registry. By squeezing the tube, toothpaste flows into the piston filling the piston interior and slides the piston with respect to the cylinder until the gate and port come into registry defining a dispensing opening. A dose of toothpaste issues from the dispensing opening during the time that the piston gate is in passing registry with the cylinder port. Toothpaste dispensing ends as the piston gate moves beyond the cylinder port. The piston comes to rest as tube squeezing ends.

After the initial priming or filling of the dispensing channel, the dispenser remains always filled with paste. The continuity of the paste string extending from the paste exit spout back down into the mass of paste within the tube is an inherent design aspect of the invention. The initial priming also assures that no air remains in the dispenser.

After dispensing a dose, the piston and cylinder are in articulated position with respect to each other. The dispenser is reset by pressing the piston into the cylinder to fully nested position ready for dispensing the next dose.

The dispenser remains in place functioning as the tube cap. The dispenser components are simple and inexpensive to fabricate and assemble while providing reliable operation in dispensing fixed doses regardless of the amount of paste remaining in the tube. The dispenser eliminates air in the tube ahead of the remaining paste, and provides a child-proof safety cap.

In a preferred embodiment of the invention, the dispenser is screwed onto the tube nozzle. In a modified embodiment when childproofing is desired, the dispenser may be permanently affixed to the tube nozzle as by ultrasonic welding.

OBJECTS OF THE INVENTION

An object of the invention is to provide a dispenser for dispensation of a measured amount from a tube.

An object of the invention is to provide a dispenser for limiting the amount of paste dispensed for each squeeze of the tube and actuation of the dispenser.

Another object of the invention is to provide a dosage dispenser for a toothpaste tube with the dispenser also functioning as a closure for the tube.

Another object of the invention is to provide a dosage dispenser which is simple to fabricate, assemble and operate.

Another object of the invention is to provide a dosage dispenser for a toothpaste tube which provides substantially the same dosage for each actuation of the dispenser regardless of the remaining amount of paste in the tube.

Another object of the invention is to provide a dosage dispenser for a toothpaste tube which provides a child safety feature in limiting the amount of paste dispensed for each squeeze of the tube, and requires that the dispenser be reset before another dose can be squeezed from the tube.

Another object of the invention is to provide a dosage dispenser for a toothpaste tube wherein the dispenser is an integral part of the tube.

Other and further objects of the invention will become apparent with an understanding of the following detailed description of the invention or upon employment of the invention in practice.

DESCRIPTION OF THE DRAWING

A preferred embodiment of the invention has been chosen for purposes of detailed description and is shown in the accompanying drawing in which.

DETAILED DESCRIPTION OF THE PREFERRED EMBODIMENT

Figure 1:
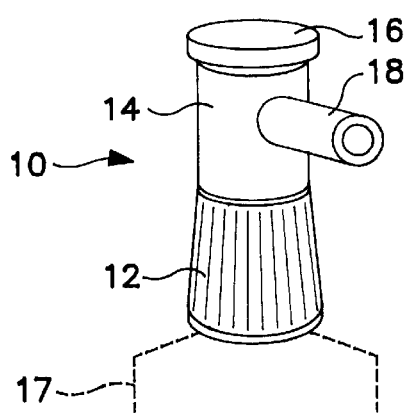
FIG. 1 is a perspective view of a dispenser according to the invention illustrating the dispenser in nested position.
Figure 2:
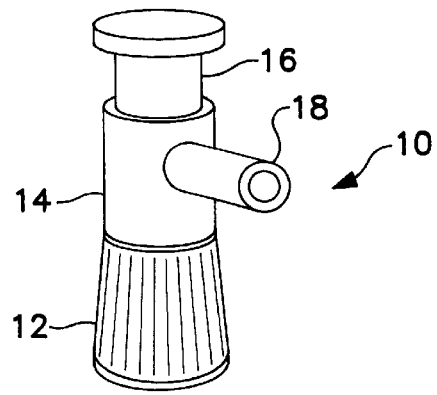
FIG. 2 is a perspective view of the dispenser of FIG. 1 with the dispenser components in articulated position.

Referring to the drawing, FIGS. 1 and 2 illustrate a dispenser 10 comprising a screw cap 12, a dispenser body 14, and a movable piston 16. The dispenser shown in FIG. 1 has the piston in nested position within the dispenser body or cylinder, and the piston of FIG. 2 is in articulated position. For dispensing toothpaste, the tube 17 is squeezed and a dose is delivered from the dispenser spout 18. During such dispensing, the piston moves from the FIG. 1 to the FIG. 2 position.

After each operation of the dispenser, the piston is manually reset from the position of FIG. 2 to that of FIG. 1.

Figure 3A:
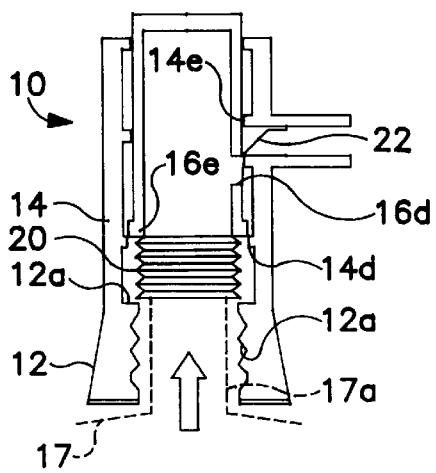
FIGS. 3a–c are schematic sectional views of internal dispenser components in sequential operating positions.
Figure 3B:
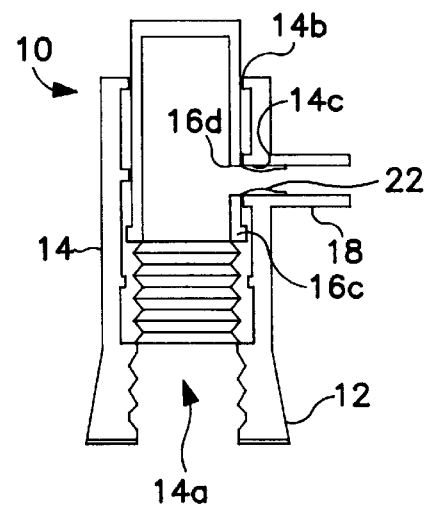
Figure 3C:
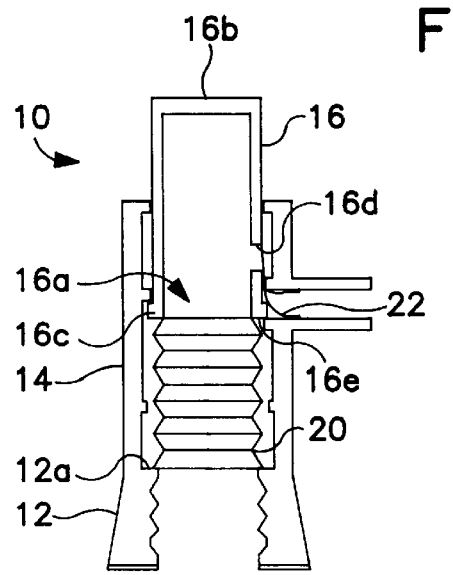

Referring to FIGS. 3a–c, the dispenser preferably includes an integral screw cap 12 and cylindrical dispenser body 14. The cap includes interior threads 12a for connection to the threaded neck 17a of a toothpaste tube 17, to replace the original cap sold with the tube.

The dispenser body or cylinder has an open lower end 14a, an open upper end 14b, and a side wall port 14c and spout 18 for dispensing toothpaste.

A hollow piston 16 with open lower end 16a and closed upper end 16b is fitted within the cylinder for sliding movement from the position of FIG. 3a to that of FIG. 3c with interior cylinder rings 14d, 14e limiting piston travel by engaging a piston ring 16c. The piston includes a gate or aperture 16d through which paste flows when port 14c and gate 16d are in registry as seen in FIG. 3b.

An inlet barrier in the form of a bellows 20 interconnects the open top 12a of the screw and the lower end 16e of the piston, and together with the cap and piston define a toothpaste flow path (arrow FIG. 3a) from tube to spout. If desired, the flow path may be further defined by a tubing barrier 22.

Figure 4:
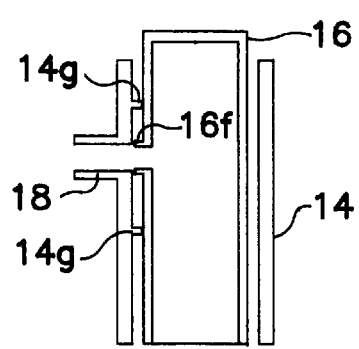
FIG. 4 is a vertical cross section of the dispenser assembly according to the invention.
Figure 5:
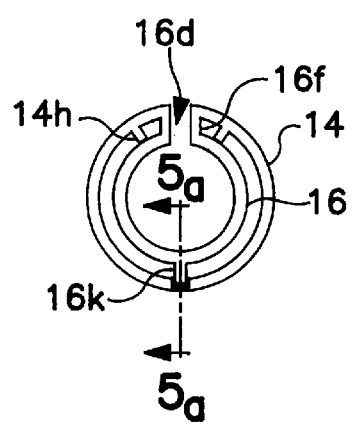
FIG. 5 is a horizontal cross section of the dispenser assembly according to the invention.
Figure 6:
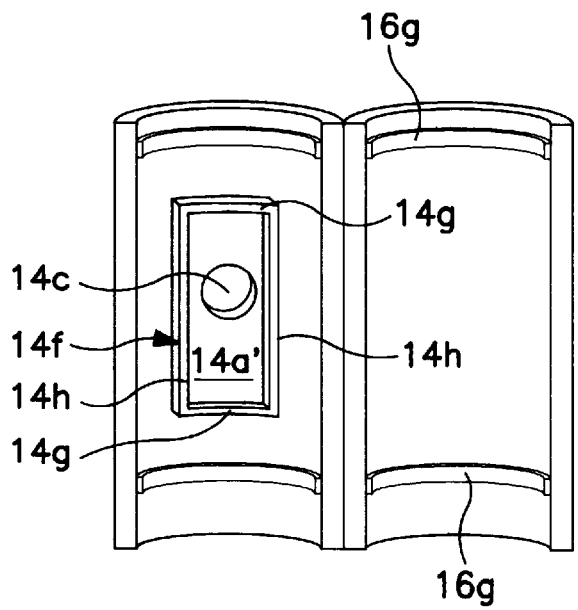
FIG. 6 is a schematic view of the interior of a split dispenser body.

FIGS. 4, 5 and 6 illustrate a fence 14f having the primary function of confining toothpaste within a defined area 14i between adjacent piston and cylinder surfaces. The fence also has a secondary function of maintaining longitudinal alignment of the piston gate 16d and the cylinder port 14c. The fence includes spaced horizontal ribs 14g connected by vertical ribs 14h which confine toothpaste and limit vertical or longitudinal as well as rotary movement of the piston 16. The piston includes an annular spout 16f confined by fence 14f on the interior surface of the cylinder.

Figure 5A:
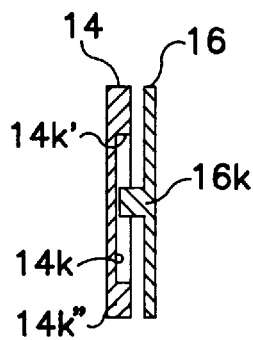
FIG. 5a is a fragmentary vertical section view taken along line 5a—5a of FIG. 5.

FIGS. 5 and 5a illustrate a projection 16k and groove 14k as primary means for maintaining longitudinal and rotary or circumferential alignment of the piston and cylinder. The groove is cut into the interior surface of the cylinder and has sufficient depth to receive the projection for sliding movement. The groove includes upper 14k' and lower 14k" shoulders to limit longitudinal movement of piston with respect to cylinder.

As also shown in FIG. 6, spaced O-rings 16g seal the piston and cylinder walls confining toothpaste to the interior of the dispenser.

Figure 7:
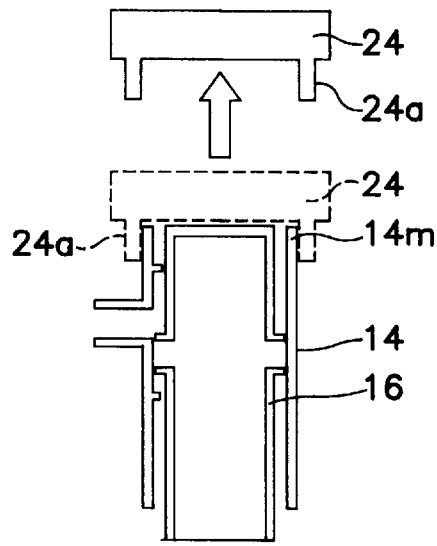
FIG. 7 is a vertical cross section of the dispenser assembly according to the invention showing a removable cap.

FIG. 7 illustrates a removable cap 24 fitted to the cylinder top end 14m by means of a depending annular skirt 24a. The removable cap when installed(as shown by dash lines in FIG. 7) prevents piston movement when the dispenser is not in use.

In use, the dispenser initially has components in the position of FIG. 3a. The dispenser is primed by squeezing the tube to fill the piston with the piston manually held in the position of FIG. 3a.

For dispensing a given dose of paste, the tube is squeezed moving the piston through the position of FIG. 3b with paste flowing through gate and port during the time they are aligned. Dispensing begins as the upper margin of the piston gate emerges above the lower margin of the port, and ends as the the lower margin of the piston gate passes above the upper margin of the port.

For each dispensing squeeze of the tube, a fixed amount of paste flows through the spout. Excessive or continued squeezing merely pushes the piston to the FIG. 3c position closing the gate and port and cutting off the flow of paste.

Various changes may be made to the structure embodying the principles of the invention. The foregoing embodiments are set forth in an illustrative and not in a limiting sense. The scope of the invention is defined by the claims appended hereto.

I claim:

1. A dispenser for issuing a measured dose of flowable contents from a squeezable container having a dispensing opening comprising a dispenser body having a hollow interior with open lower and upper ends, a dispensing port in the dispenser body, means for connecting the dispenser body to the container dispensing opening, a slidable member fitted into the hollow interior of the dispenser body, the slidable member being an elongate body with hollow core, open lower end and closed upper end, the slidable member having a dispensing gate, the slidable member having a first position nested within the hollow interior and a second position in which the slidable member projects through the open upper end of the dispenser body, and the port and gate being in longitudinal alignment so that when the container is squeezed container contents flow into the dispenser thereby moving the slidable member from the first position toward the second position, and issuing a dose of flowable contents from the dispenser as the port and gate come into open registry with each other, and dispensing ending as the port and gate pass out of open registry as the slidable member continues movement toward the second position.

2. A dispenser for issuing a measured dose of paste from a squeezable tube having a dispensing nozzle comprising a generally cylindrical dispenser body having a hollow interior with open lower and upper ends, a dispensing port in the dispenser body between its upper and lower ends, the dispenser having an integral cap for connecting the dispenser body to the tube nozzle, a piston fitted into the hollow interior of the dispenser body, the piston having a hollow core, an open lower end and a closed upper end, the piston having a dispensing gate, the piston having a first position nested within the hollow interior and a second position in which the piston projects through the open upper end of the dispenser body, and the port and gate being in longitudinal alignment so that when the tube is squeezed paste flows into the dispenser thereby moving the piston from the first position toward the second position, and issuing a dose of paste from the dispenser as the port and gate come into open registry with each other, and dispensing ending as the port and gate pass out of open registry as the piston continues movement toward the second position.

3. A dispenser as defined in claim 2 in which the interior of the dispenser body is fitted with a fence of horizontal and vertical ribs around the port and the piston gate has an annular spout for confining toothpaste and maintaining longitudinal registry of the port and gate.

4. A dispenser as defined in claim 3 in which the interior of the dispenser body is fitted with upper and lower O-rings to confine paste to the interior of the dispenser as it flows therethrough.

5. A dispenser for issuing a measured dose of paste from a squeezable tube having a dispensing nozzle comprising a dispenser body having a generally cylindrical wall defining a hollow interior surface with open lower and upper ends, a dispensing port in the cylindrical wall between its upper and lower ends, the dispenser having a downwardly depending cap for connecting the dispenser body to the tube nozzle, a piston fitted into the hollow interior of the dispenser body, the piston having a hollow core, an open lower end and a closed upper end, the piston having a dispensing gate, the piston having a first position nested within the hollow interior and a second position in which the piston projects through the open upper end of the dispenser body, and the port and gate being in longitudinal alignment so that when the tube is squeezed paste flows into the dispenser thereby moving the piston from the first position toward the second position, and issuing a dose of paste from the dispenser as the port and gate come into open registry with each other, and dispensing ending as the port and gate pass out of open registry as the piston continues movement toward the second position, the interior surface of the dispenser body having spaced cylinder rings for defining the first and second positions of the piston, the piston having a ring cooperating with the cylinder rings, and a bellows member interconnecting the open lower ends of the dispenser body and piston for directing flow of paste to the hollow core of the piston.

6. A dispenser for issuing a measured dose of flowable contents from a squeezable container having a dispensing opening comprising a dispenser body having a hollow interior with open lower end, a dispensing port in the dispenser body, means for connecting the dispenser body to the container dispensing opening, a slidable member fitted into the hollow interior of the dispenser body, the slidable member being an elongate body with hollow core, open lower end and closed upper end, the slidable member having a dispensing gate in longitudinal alignment with the dispensing port, the slidable member having a first, second and third positions within the hollow interior in which the dispensing gate is respectively below, in open registry with, and above the dispensing port, and the port and gate being in longitudinal alignment so that when the container is squeezed container contents flow into the dispenser thereby moving the slidable member from the first position toward the third position, and issuing a dose of flowable contents from the dispenser as the port and gate come into the second position in open registry with each other, and dispensing ending as the port and gate pass out of open registry as the slidable member continues movement toward the third position.

7. A dispenser as defined in claim 6 in which the dispenser body is permanently affixed to the container dispensing opening.

8. A dispenser as defined in claim 6 in which the slidable member and the dispenser body are fitted with cooperating projection and groove for maintaining longitudinal and circumferential alignment.

9. A dispenser as defined in claim 6 which further includes means for confining toothpaste within a defined area between adjacent piston and cylinder surfaces.

* * * * *